United States Patent
Schulze et al.

[11] Patent Number: 6,142,291
[45] Date of Patent: Nov. 7, 2000

[54] SELF-CLEANING INCLINED SECTION FOR DRAG CONVEYOR

[75] Inventors: Sandra M. Schulze, Yorkshire; Jon F. Baker, Sidney, both of Ohio

[73] Assignee: Sidney Manufacturing Company, Sidney, Ohio

[21] Appl. No.: 09/222,985

[22] Filed: Dec. 31, 1998

[51] Int. Cl.$^7$ .................................................. B65G 19/06
[52] U.S. Cl. ........................ 198/727; 198/734; 198/735.2
[58] Field of Search ............................... 198/735.2, 735.6, 198/716, 733, 735.5, 727, 728, 734

[56] References Cited

U.S. PATENT DOCUMENTS

| | | | |
|---|---|---|---|
| 1,330,813 | 2/1920 | Lister | 198/734 |
| 1,596,566 | 8/1926 | Newdick | 198/734 |
| 3,111,216 | 11/1963 | Geberin | 198/727 |
| 3,954,168 | 5/1976 | Braun et al. | 198/734 |
| 4,359,154 | 11/1982 | Temme | 198/735.2 |
| 4,815,586 | 3/1989 | Heising | 198/734 |
| 5,601,341 | 2/1997 | Merten et al. | 198/735.2 |
| 5,605,220 | 2/1997 | Krohm | 198/727 |

FOREIGN PATENT DOCUMENTS

| | | | |
|---|---|---|---|
| 2153078 | 5/1973 | Germany | 198/734 |
| 566936 | 8/1977 | U.S.S.R. | 198/727 |

*Primary Examiner*—Robert P. Olszewski
*Assistant Examiner*—Steven B. McAllister
*Attorney, Agent, or Firm*—William Weigl

[57] ABSTRACT

A drag conveyor for particulate material is provided with an upwardly-curved bend section for conveying the material with paddles mounted on a continuous chain from a first level to a second, higher level. The paddles are provided with angled portions on opposite sides thereof which, together with the bottom of the trough of the conveyor and correspondingly angled portions of the conveyor above the trough, confine the paddles while traveling through the bend section. The angled portions of the paddles constitute a bearing surface in cooperation with the angled portions of the conveyor in the inside curvature of the bend section to maintain chain tension and keep the paddles in self-cleaning contact with the trough bottom.

20 Claims, 4 Drawing Sheets

SELF-CLEANING INCLINED SECTION FOR DRAG CONVEYOR

This invention relates to a drag conveyor for particulate material and in particular, to self-cleaning drag conveyor that carries such material from a first level to a second level above the first level.

BACKGROUND OF THE INVENTION

Drag conveyors of the type disclosed herein receive particulate material such as grains, pet food, plastics, animal feed, powders, flour, coffee beans and some paste-like substances etc. at an inlet to the machine and transfer them to a second location where they may be blended, bagged, mixed, stored, pelletized, etc. Various types of drag conveyors have been in use for almost a century. With the exception of the design disclosed in pending U.S. patent application Ser. No. 08/905,012 filed on Aug. 11, 1997 by Jon F. Baker, now U.S. Pat. No. 5,947,251, issued Sep. 7, 1999, only one type of drag conveyor design is believed to have the true capability of being self-cleaning to some extent, i.e., capable of removing all material from the conveyor at the completion of a run. This latter conveyor has a U-shaped trough, and can perform in a self-cleaning capacity so long as the paddles that drag the material through the trough maintain the shape of their edges. Paddles for such conveyors are typically made of a conventional ultra-high molecular weight plastic to minimize friction against the typical metal sheet steel trough, but even that material is subject to wear after time. An example of a U-trough conveyor is shown in U.S. Pat. No. 5,174,433 granted to Robert H. Moser and assigned to InterSystems, Inc. of Omaha, Nebraska on May 21, 1992. U.S. Pat. No. 5,947,261 incorporated herein by reference for its disclosure of the preferred type of drag conveyor with which my improvements are useful. To the extent that a round-bottomed or U-trough drag conveyor is referred to herein from time to time, the Moser patent is incorporated herein as exemplary of such a design.

Whenever the Baker, Moser or other conveyors are required to move the material from a first level to a second higher level, they typically receive the material at an inlet hopper of a first horizontal section, transport it to an upwardly-curved section known in this particular art as a "bend section", and discharge the material either from a straight upwardly-inclined section or from a straight "header end" at which the material is immediately discharged just beyond the bend section.

Upward inclined conveyance of granular material requires that a divider pan be utilized between the runs of a continuous chain through the lower, carrying run of conveying paddles and an upper, return run of the return paddles. The pan typically extends at least from the inlet end of the bend section all the way through to the end of the drag conveyor. This divider pan inhibits material from spilling over or flowing backwardly over the tops of the carrying paddles opposite to the carrying direction due to gravity, as they would tend to do in the absence of a divider pan. The Moser type of round-bottomed conveyor attempts to solve this problem by confining or entrapping the carrying paddles against the bottom of the trough, through use of the divider pan as a hold-down bearing surface contacting the top, horizontal edges of the paddles. The load-receiving pan thus serves to maintain tension in the chain as the paddles pass around the inside curve of the bend section. This confining of the round-bottomed paddles requires that the bend section and the divider pan both be designed about a large radius.

Obviously, since the trough of a round-bottomed bend section is curved and passes about a radius spaced some ten feet or more above the bend section, the compound curve and round or U-shaped bottom present design and manufacturing problems of some significance. Further, most but not all drag conveyors for particulate material require that the upper horizontal edges of the paddles be beveled to prevent the collection of what is commonly referred to as "soldiers", particulate material standing on the upper edges of the paddles in the lower or carrying portion of the chain run. If the same material was always being conveyed, soldiers are not a problem. But where converting from one kind of material to another, the existence of soldiers can present a significant problem. If converting from the transporting of dog food to cat food or vice versa, for example, no purchaser of dog food wants cat food in the purchased bag. The same is true for the purchaser of cat food. Carry-over of material from one run to the next is undesirable in most cases, and totally unacceptable in others. To avoid collection of soldiers, the tops of the paddles are preferably and sometimes necessarily beveled downwardly and forwardly, the latter so that soldiers fall in front of the paddle on which they would tend to collect, but are prevented from doing so by the bevel. These beveled edges typically come to a near point or sharp edge. That means that if a Moser-type conveyor used beveled edge paddles, utilizing the divider pan as a bearing surface to hold the round paddle bottoms against the trough bottom during passage through the bend section, would wear against the sharp bevel edges of the paddles while these edges are in contact with the divider pan. That load can be heavy, since the divider pan is the sole chain tension provider in the carrying run of the bend section. Because of this, a Moser-type conveyor often sacrifices the benefit of beveled edge paddles in favor minimizing paddle wear, thus making the unit less effective for cleaning itself at the end of a run for certain materials. It's a trade-off between either slowing down paddle wear or eliminating the soldier problem through use of beveled paddles. In the upper return run of the chain, tension may be maintained in the bend section by the rounded bottoms of the paddles riding against a specially-constructed inverted round bottom or against a pair of wear rails extending about a curve corresponding to the bend section curvature. At least in the upper run, the wider edges of the paddles would provide the bearing surface, rather than the sharper beveled edges of the tops of the paddles taking the brunt of the load, as in the carrying run, were paddles with bevels to be used.

Square paddles are also used in drag conveyors, but are typically used in situations where self-cleaning capability is not a prerequisite. Such square paddles require some small measure of side edge clearance to avoid skewing as they travel along the trough. When used in a bend section, although it is not known precisely how they confine the carrying paddles, presumably they too would utilize the divider pan or perhaps guide rails to hold the paddles down against the trough bottom. Also presumably, the hold-down means would contact the upper beveled edges of the paddles, if in fact they are beveled, causing wear to ensue more rapidly than if wider, non-beveled edges were made to accept the brunt of the bend section wear. My understanding is that square paddles do not have the benefit of beveled edge paddles, and such conveyors find more frequent use in environments where self-cleaning is not a prerequisite.

Many conveyors other that those described in the herein-incorporated Baker '261 patent and Moser '433 reference necessitate the use of idler sprockets for supporting the upper return run of the continuous chain. As recognized in the Baker reference, these idler sprockets are a significant maintenance problem requiring excessive down-time of the conveyor and of machinery fed by the conveyor whenever sprocket bearings must be changed. A need exists for a drag conveyor having a bend section, in which the conveyor trough sides provide the sole support for beveled edge paddles throughout the entire carrying and return runs, and do so without requiring the use of the beveled edges as load-bearing components.

SUMMARY OF THE INVENTION

A drag conveyor for particulate material is provided with an upwardly-curved bend section for conveying the material by means of paddles mounted on a continuous chain from a first level to a second, higher level. The paddles are provided with angled portions on opposite side edges thereof which, together with the bottom of the trough of the conveyor and angled walls of the conveyor above the bottom, confine the paddles while traveling through the bend section. The angled edges of the paddles constitute a bearing surface in cooperation with the angled walls of the conveyor in the bend section to maintain chain tension and keep the paddles in self-cleaning contact with the trough bottom.

It is a principal object of this invention to provide a truly self-cleaning bend section for a drag conveyor.

Specifically, it is an object of this invention to provide a bend section having wall portions which cooperate with opposed angled edges of the paddles in a manner that avoids the need for utilizing sharp, wear-prone beveled edges of the paddles to act as load-bearing surfaces against a divider pan.

A further object of the invention is to provide a drag conveyor having a bend section with a paddle-confining space therethrough so as to enable the trough bottom to be self-cleaned by the paddles, and which also allows the paddles to receive the benefit of having their top edges beveled to eliminate "soldiers" from collecting.

Another object of the invention is to provide a relatively simple method of constructing a drag conveyor bend section from compound-curved individual computer-generated parts.

A further object is to avoid the necessity of using a divider pan of a drag conveyor bend section to act a hold-down load-bearing surface to maintain carrying paddles against the trough bottom.

Other objects and advantages will become apparent from the following description, in which reference is made to the accompanying drawings.

DESCRIPTION OF THE PREFERRED EMBODIMENT

Figures 1, 2, 3:
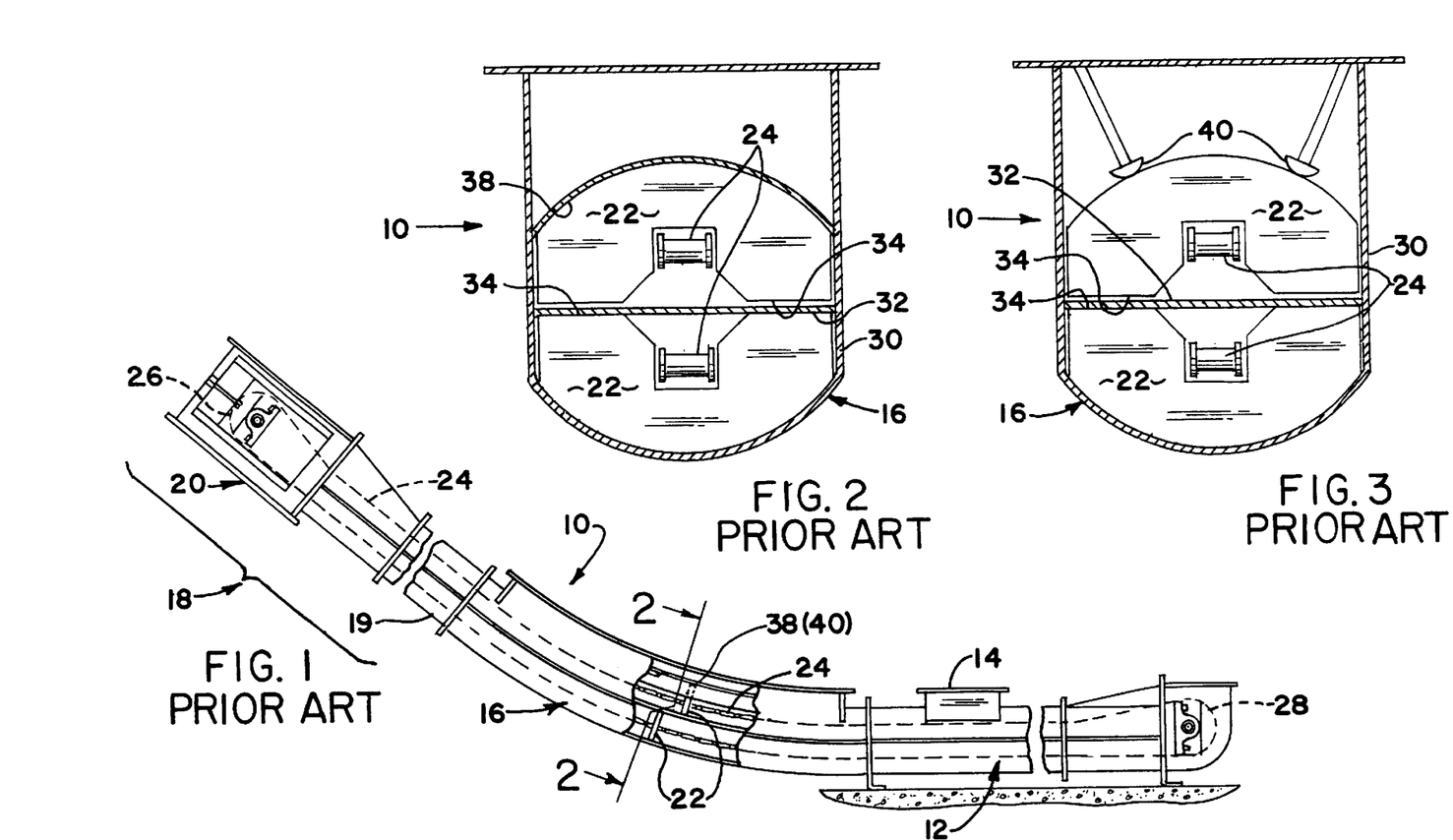
FIG. 1 is a simplified side elevational view of a round-bottomed or U-trough drag conveyor of the prior art having a bend section intermediate a pair of straight sections.
FIGS. 2 and 3 are simplified alternate forms of hold-down apparatus believed to have been utilized with the prior art apparatus of FIG. 1, and are taken as cross-sections essentially along lines 2—2 of FIG. 1.

Referring now to the prior art design of FIGS. 1–3, a drag conveyor 10 includes a first straight section 12 having a hopper 14 for receiving infeed of material (not shown), a second bend section 16 and a third straight section 18 which includes a straight inclined portion 19 and a header end or section 20 at which material is discharged by gravity to another conveyor or machine. It should be understood that the third straight section 18 may consist of the straight inclined portion 19 and header end 20 either together or either one alone. Since at least a small segment of the header section is straight where it connects to its immediately preceding section, in those instances where a third straight section is referred to as being at the exit end of the bend section, that straight section may be either as shown in FIG. 1 or it can be a header section 20 connected directly to the outlet from the bend section.

The material is conveyed by a plurality of high-density molecular weight plastic paddles 22 spaced along a continuous chain 24. Conventional paddles are typically about one-half inch in depth or thickness. A drive sprocket 26 pulls a lower "carrying" run of the chain 24 leftwardly and returns the chain rightwardly around the drive sprocket to a driven sprocket 28 at the right end of the conveyor. All of this has been conventional for a considerable period, and is described only briefly and generally to present a background for an understanding of the environment of the improvements of this invention. It should be understood, however that the upper run of the chain of this prior art design of FIGS. 1–3 is either supported at closely-spaced locations by idler sprockets, (not shown herein, but shown and discussed in the Baker reference which has been incorporated herein by reference), or may be supported by rails also shown in the prior art in Baker. Because the chain is necessarily quite sturdy and heavy and tends to sag, chain tension must be relatively high in comparison to the design of the Baker reference, resulting in greater wear potential in the bend section 16, where the bearing surfaces that maintain tension while the chain is passing therethrough are now about to be described. While the Baker chain is equally heavy, angled edge portions of the paddles support the chain and paddles directly on angled wall portions of the conveyor trough in the return run and thus eliminate the concern for sag and the attendant need for the idler sprockets or paddle-supporting rails of Moser.

FIG. 2 shows one variation of a means for confining the paddles in the carrying run of the chain and supporting the paddles on the inside curvature of the bend section in the return run. In actuality, a trough 30 may be deeper in the straight sections 12 and 18 and shallower in bend section 16. In the straight sections, there can be substantial clearance between the top or inside edges of the carrying paddles and the upper run of the chain, enough to allow for placement of the idler sprockets between the chain runs. Or, if rails are used for paddle support in the return run as disclosed in Moser, the space can be reduced to what is shown in FIGS. 2 and 3, i.e., kept to a minimum. In the bend section 16, however, a divider plate 32 is provided between the chain runs for the full length of the bend section and the straight inclined portion 19 when one is provided at the exit end of the bend section. This divider plate 32 is shown in position without showing the manner of its being connected to the trough 30. It could be either bolted or welded in place to the trough. It will be seen in FIG. 2 that a top edge 34 of a paddle contacts the underside of the divider plate 32 and forces the lower curvature of the paddles to contact the bottom of the trough 30. The only clearance in the bend section between the carrying paddles in the lower chain run and the trough is at the vertical side edges of the paddles. This clearance is only enough to prevent skewing of the paddles as they pass through the conveyor. If the material conveyed is small enough to pass through the side edges and the trough vertical walls, gravity will cause them to move to the bottom of the curved trough and be picked up by the next paddle. This, in essence, is why round-bottomed troughs are advertised by their manufacturer as being self-cleaning. But if the top edges of the paddles were beveled, they would have a nominal front-to-back depth, perhaps less than $\frac{1}{16}$th of an inch, even when new. Such sharp edges would wear rapidly due to surface contact with the underside of the divider plate 32. As they would wear, the rounded paddle bottoms would become increasingly spaced from the trough bottom, tending to permit material to pass under the paddles in some instances. At the very minimum, wear at the sharp top edges would reduce the self-cleaning potential. The abrasiveness of many conveyed materials is such that wear can progress rapidly. So, as a result, the paddle top edges are ordinarily kept blunt to provide a greater edge surface area in contact with the divider pan. But in doing so, the system loses the aforementioned benefit provided by beveled edges. In effect, if the prior art system of FIGS. 1–3 were to use beveled edge paddles, it would perform quite effectively as a self-cleaning conveyor at the outset, but become progressively less effective with time. As will be seen later, the present invention does not use the thin beveled edges of the paddles and a divider plate to effect hold down of the paddles in the bend section of the carrying run of the conveyor. Instead, it uses other angled unbeveled paddle edges and trough side walls portions that provide substantially greater surface area to hold the paddles down to the trough bottom. By eliminating the sharp paddle edges from having to provide the load-bearing surface contact as the paddles traverse the bend section, I prolong the useful life of the paddles while retaining the added self-cleaning benefit of beveled edges.

FIG. 2 shows that form of the prior art design in which a specially-constructed inside curve section 38 is provided in the bend section 16. The bottom rounded edges of the paddles 22 contact the inside surface of curve section 38 to maintain chain tension within the bend section 16 as it is traversed by the upper chain run. This is apparent from the showing of clearance between the edges 34 and the divider plate 32 in the return run.

FIG. 3 shows another way of maintaining chain tension around the inside curve of the bend section 16 in the return run of the chain. This depiction is substantially like that of FIG. 2 with but one main exception. In this FIG. 3 modification, the curve section 38 is replaced with a pair of bearing rails 40 to minimize the amount of surface contact of the paddle bottoms with the bend section. But, depending on the width of the rails 40 and the amount of wear that takes place at the points of contact between the rails and paddles, the potential exists for grooves to be worn at the paddle bottom edges.

Many of the same problems of the round-bottomed conveyor also exist for drag conveyors with square or rectangular paddles whenever they pass through a bend section. They are confined to the extent they can be in the carrying run of the chain, and must bear on the inside of a curved cover plate in the bend section return run.

Figures 4, 5:
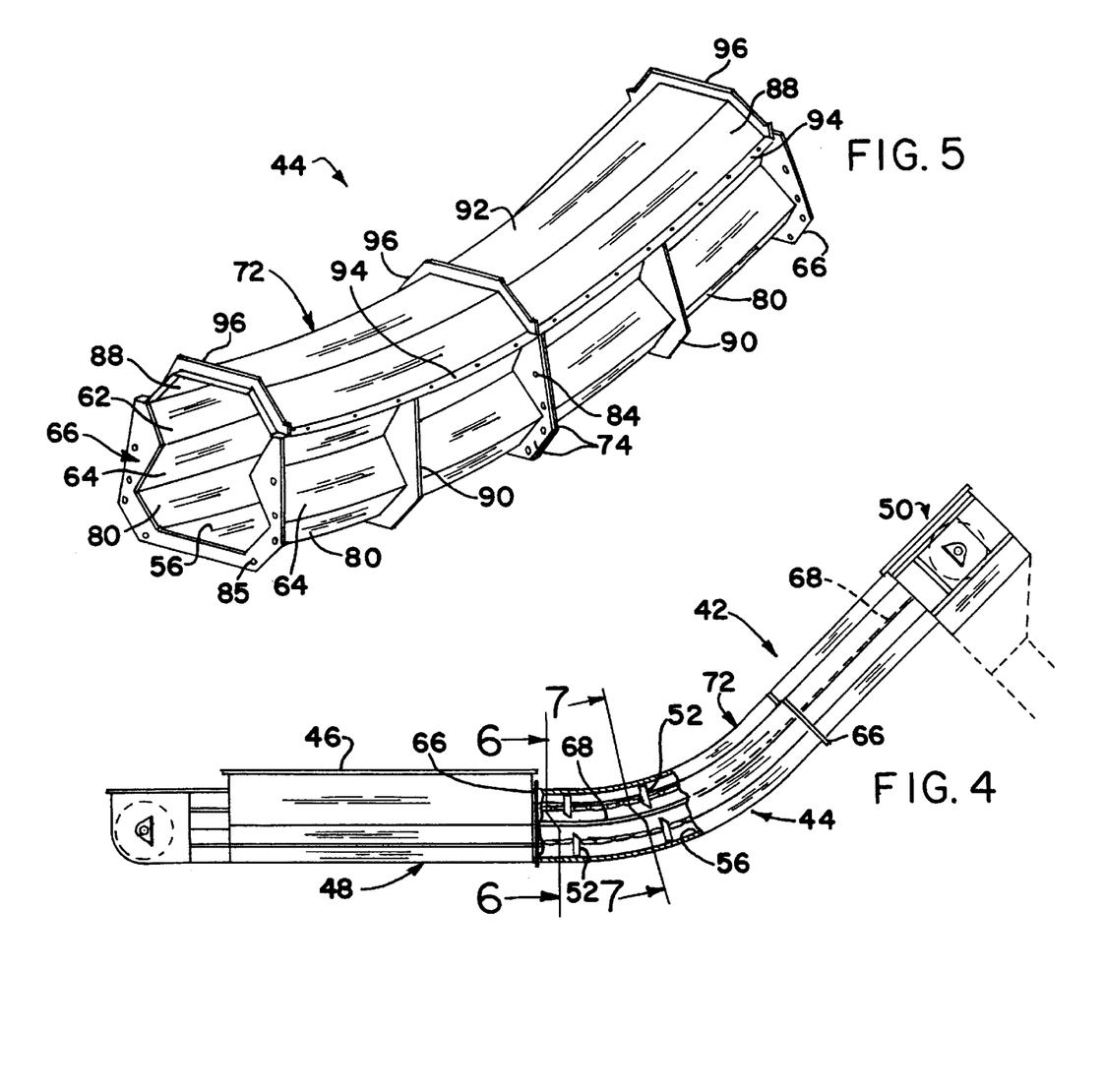
FIG. 4 is a simplified side elevational view of a drag conveyor incorporating a bend section of this invention.
FIG. 5 is an isometric view of a bend section of the present invention after it has been constructed and is ready to be incorporated into a drag conveyor.

FIG. 4 illustrates in simplified fashion a drag conveyor 42 incorporating a bend section 44. The conveyor 42 has an inlet hopper 46, a first straight section 48 and a header end or section 50. In this depiction, the header end 50 is connected directly to the outlet end of the bend section 44, and for claiming purposes, can be considered a third straight section by itself.

Figure 6:
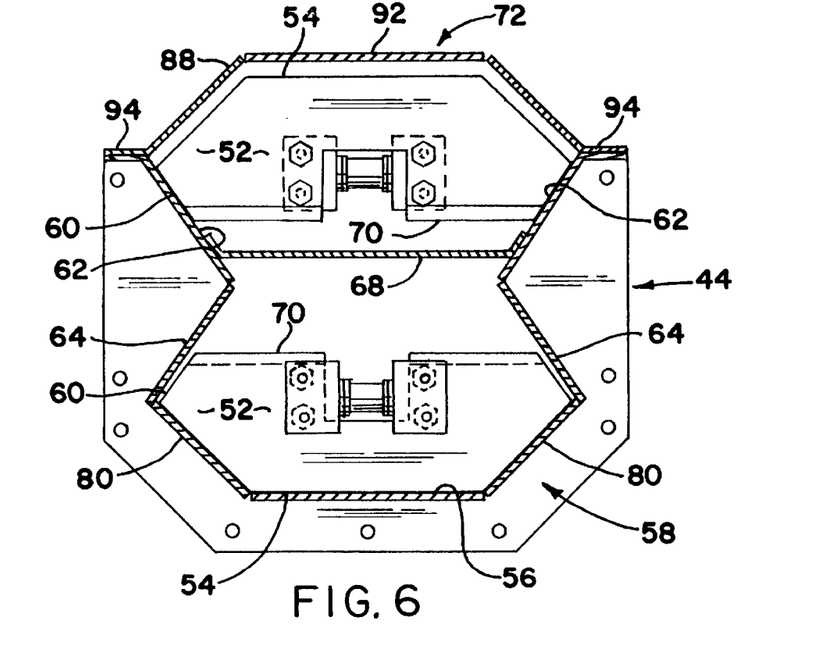
FIG. 6 is a cross-sectional view of a portion of the conveyor that is straight, and is taken essentially along lines 6—6 of FIG. 5.

Like the aforementioned prior art, I wish to confine the paddles in the lower material-carrying run of the chain in order to make the system capable of being self-cleaning. The paddles perform substantially like those in the incorporated Baker reference in the straight sections of the conveyor. In essence, the cross-sectional view of FIG. 6 shows that the outermost edges 54 of the paddles rest on the flat bottom 56 of a trough 58. Inwardly-angled edges 60 of the paddles bear on opposed surfaces 62 of the conveyor trough in the return chain run. While lines 6—6 of FIG. 4 occur inside the inlet end of the bend section 44, about twelve inches at each end of the bend section 44 are straight, so as to blend nicely into the curvature of the radiused portion of the bend section 44. Thus, the FIG. 6 showing can be said to be the same as that of a straight section, and the lines 6—6 are placed where they are for convenience only. It will be noticed that there is a slight clearance of perhaps $\frac{1}{8}$th of an inch between the inwardly-angled edges 60 of the paddles and the adjacent corresponding walls 64 of the trough in the carrying run of the chain. It will also be noted that the edges 60 are riding on the surfaces 62 for chain and paddle support in the return chain run. The latter is an important feature of the patent application of Baker, and is important for any paddle configuration to eliminate the need for idler sprockets as mentioned previously. It can, in fact, be useful with round bottomed paddles to achieve the objectives of my invention, as demonstrated in Baker.

Figure 7:
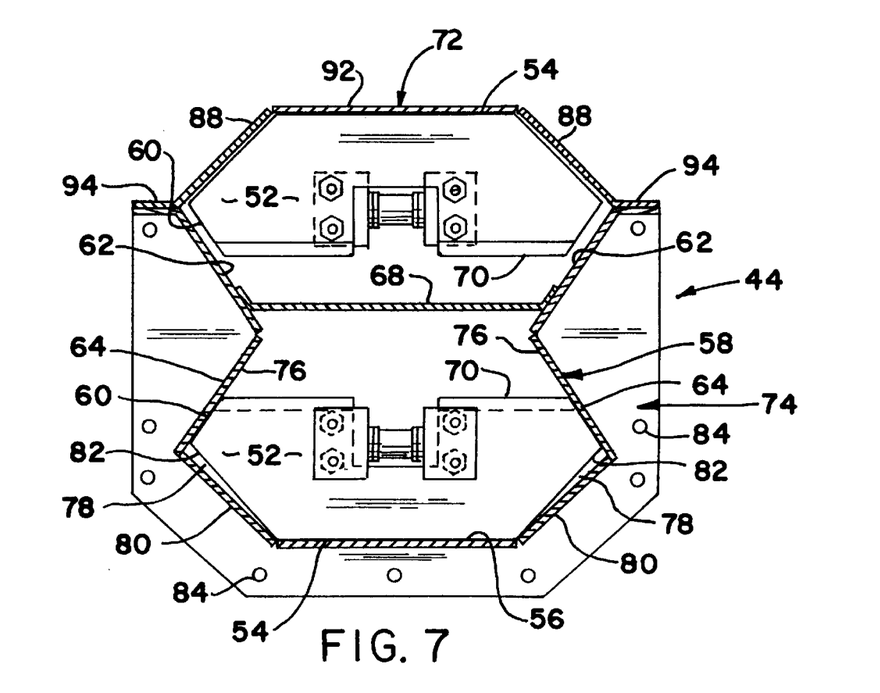
FIG. 7 is a cross-sectional view of a portion of the bend section of the conveyor that is curved, and is taken essentially along lines 7—7 of FIG. 5.

Within the one foot length inside the inlet end of the bend section as defined by a flange 66, the cross-sectional shape and size of the bend section 44 blends from the straight section of FIG. 6 to the paddle-confining shape of FIG. 7. In this latter Figure, it can be seen that the paddles in the carrying run are trapped or restrained by three edges between the bottom 56 and the walls 64. And it will also be noted that a divider plate 68 is spaced well above the thin, relative sharp edge 70 at the inside edges of the paddles. All bearing surfaces of the paddles in the carrying run are between the flat bottom 56 of the trough and around outside edges 60 up to, but not including, the sharp edges 70. Thus, FIG. 7 shows the confinement of the paddles by wider, half-inch thick front-to-back surface areas of the paddles, subjecting them to considerably less wear than if the edges were sharp. This is further due to the fact that use of those same blunt edges 60 to support the paddles on the surfaces 62 in the straight sections in the return run allows the chain to be operated with a lower tension than the FIG. 1 prior art, due to elimination of the chain weight-sustaining idler sprockets.

The upper run of paddles in FIG. 7 can be seen to ride on the inside surface of a cover 72 of the bend section 44. This cover 72 is removably bolted to the trough in conventional fashion by bolts, not shown. The divider pan 68 may also be similarly bolted to the conveyor trough. Also, because the cover 72 is a load-bearing surface for the paddles in the bend section 44, it is preferably made of heavier gauge mild steel than the material for other covers aligned with the cover 72 and extending over straight sections of the drag conveyor. Obviously, tension should be removed from the chain before the cover is removed, because of its travel about an inside curve of the bend section in which the cover itself proves the tensioning means. This is easily accomplished by appropriately adjusting the drive sprocket toward the driven sprocket in conventional fashion to release tension.

FIG. 5 shows a bend section 44 of about seven feet in length. It can be made in either two, three or more parts, depending on the needs for a particular conveyor. When made in two parts as shown in FIG. 5, for example, the parts are separable at a pair of flanges 74 at the center. Each part is thus a mirror image of the other between its ends, simplifying manufacture. The first twelve inches at the left end of the bend section 44 gradually decrease in cross-section from that of FIG. 6 to that of FIG. 7. The second part has an exit end at the right that gradually increases in cross-section from that of FIG. 7 to that of FIG. 6 to blend nicely with the next-following straight section. When the flanges 74 are bolted together to form the complete bend section 44, it has a gradually-decreasing entrance for twelve inches which blends to the outside dimensions of the paddles, and the final twelve inches gradually increases to that of the next-following straight section. The divider plate 68 has no bearing surface function, but serves mainly to prevent the tendency of backflow of material over the tops of the paddles. The paddles may be made higher than what is shown to inhibit such backflow if desired.

Figure 8:
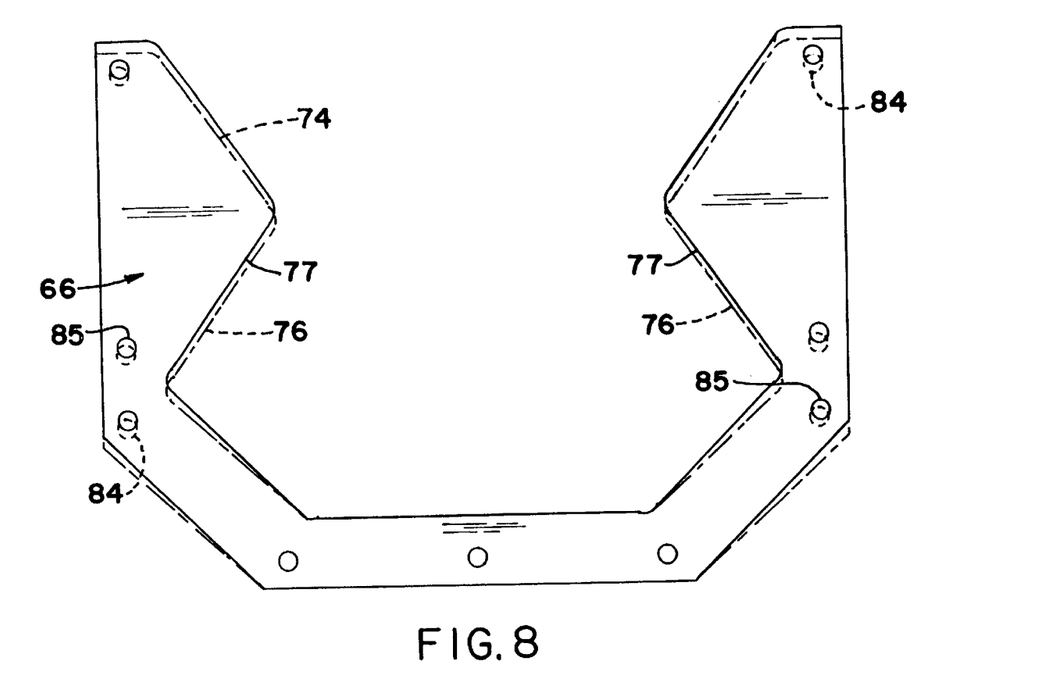
FIG. 8 is an overlay view of different interconnecting flanges of the bend section, illustrating their potential for enabling computer-generated parts of the bend section to be assembled into the configuration of FIG. 7 by utilizing the conveyor parts themselves as fixtures, and thus eliminating the need for additional, special manufacturing fixtures.
Figure 9:
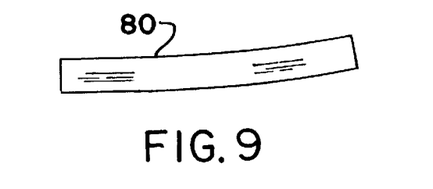
FIG. 9 is one simple plate that will became a wall portion of the bend section before assembly to the flanges of FIG. 8.

By cross-referring now to FIGS. 5, 8 and 9, I will now describe how the bend section 44 is constructed without the use of fixtures, or, stated another way, by using the elements which make up the bend section as their own fixtures. In order to accomplish this, the separate plates making up the bend section must be made very accurately. This becomes feasible by utilizing computer drafting and computer-controlled plasma burning machines. The plates, of which that in FIG. 9 shape is but one, are accurately cut to exact sizes that take into consideration the compound curves inherent in the design of the bend section 44. The flanges 74 and 66 are of different sizes as can be seen in FIG. 8, where an end flange 66 is shown in solid lines and a center flange 74 is comparatively shown in dot-dash lines. The effect of reducing the height of the center flanges 74 relative to that of end flanges 66 is to lower a pair of edges 76 of center flanges 74 relative to edges 78 of end flanges 66. These edges 76 and 78 have welded thereto plates 64 shown in FIGS. 6 and 7. As a paddle is pulled by the chain from the FIG. 6 position into the bend section 44 inside its inlet end at the left of FIG. 5, its natural tendency is to lift off the bottom of the trough if permitted to do so. To eliminate this tendency, the clearance between walls 64 and the inwardly-angled edges 60 is closed, crowding the paddle downwardly to maintain the outermost bottom edge 54 of the paddle in contact with the flat bottom 56 of the trough. As this occurs, the paddle is confined within the bend section curved portion as shown in FIG. 7. At the same time, a narrow angular space 78 (FIG. 7) begins to open between plates 80 and corresponding lower upwardly-inclined edges 82 of the paddle. The space 78 is shown slightly exaggerated in size in FIG. 7 to illustrate the effect of confining the paddle to maintain it in self-cleaning contact against the bottom of the trough.

This occurs because of the desire to maintain the edges 76 and 77 (FIG. 7) parallel, in order to have three-edge contact of the paddles with the trough at all times. While some small granular material may tend to want to escape past the paddle through the space 78, gravity will still return the material downwardly to the flat bottom of the trough to assure its being conveyed to its final destination at the end of a run. This technique of confining and then reopening the bend section 44 to the FIG. 6 size is also found to enable a convenient method of constructing the bend section 44, as will now be described.

As noted earlier, the bend section 44 is made of two mirror-image parts which are interconnected by bolting the center flanges 74 together at the middle as seen in FIG. 5. I will describe the making of only the left part, it being understood that the right part is identical until the separate parts are brought into abutment and joined at center flanges 74. It should also be noted from FIG. 8 that alignment holes 84 in center flanges 74 are offset downwardly from holes 86 of flanges 66 to eliminate the possibility of the parts of the bend section from being improperly joined. Of the entire conveyor all interconnecting flanges are like end flanges 66. The center flanges 74 are used only in the bend section 44, and the number of flanges 74 used is dependent upon the number of parts from which the bend section is produced. If, for example, the bend section is made of three parts, there will be four plates 74, one pair where the middle part is connected to each of the inlet and outlet ends of the bend section. The cover 72 is an integral operating part of the bend section 44 that serves as a bearing member for the paddle edges 54. It too requires accuracy in producing and assembling its angled plates 88.

Each part of the bend section 44 is constructed by first tack-welding the ends of flat bottom plate 56 at right angles to the inside edge of one flange 66 and flange 74. In addition, a bracing flange 90 (FIG. 5) in the dot-dash shape of flange 74 in FIG. 8 is tack-welded midway between the flanges 66 and 74. At this time the three flanges are all perpendicular to the flat bottom 56. The next step is to take a pair of plates 80 of FIG. 9 and tack them in their final positions as shown in FIG. 5. In order to do this most effectively, they are first tacked at one end, e.g., the inlet end at the left of FIG. 5. The tacking then proceeds rightwardly to the flange 94 and then 74, using the edges of the bottom plate 56 to line up with the slightly straight and slightly curved edges of the plates 80. This means that the bottom plate 56 and its attached flanges 66 and 74 must be bent upwardly to match the lower edges of plates 80 as the plates are progressively attached. The remaining plates that make up the trough of the bend section 44 are similarly aligned to build the bend section from the bottom up. At completion, the abutting edges are all seam welded to make the part of the bend section 44 into a unit. When the second part is made in identical fashion, the center brackets 74 have their holes 84 aligned and are bolted together.

The cover 72 is made of five separate plates that extend the full assembled length of the bend section 44. A top plate 92 and a pair of flange plates 94 are rectangular, long and narrow, and the pair of angled plates 88 are long and curved. These plates are assembled in the same manner as the build-up of the trough of the bend section 44, by first tacking the top plate 92 to three bracing flanges 96. Because this top plate becomes the bearing surface for the paddles in the return run of the bend section on its inside, its necessary heavier gauge makes it convenient the first roll it to approach its final curvature while it is still in one piece. The flanges are then attached, making sure they are perpendicular to the point of attachment. The edges of bottom plates 88 are then laid against the edges of the plate 56 and tacked in place, bending the plate 66 manually as required to make the edges meet properly. The flange plates 94 are finally put in place and the top is complete. Although not illustrated, it should be understood that flange plates 94 are bolted to corresponding flange plates provided on the trough. Ordinarily, a depending edge may be provided on the outer edges of the plates 94 to enclose the flanges to which the plates 94 are attached.

I have demonstrated the construction of a bend section for a drag conveyor which assures that the conveyor be self-cleaning throughout its length from the inlet of material to the outlet. And it has been achieved without necessitating that any beveled edges of the paddles perform a load-bearing function. It allows beveled-edge paddles to be utilized in a drag conveyor independent of whether or not it has a bend section, enabling beveled edge paddles to become the standard for all such drag conveyors, rather than using them only with conveyors lacking a bend section. In effect, whether the paddles be or not be beveled has been taken out of the equation, since such edges never become a load-bearing edge.

Various changes may be made in the structure and manner of construction without departing from the spirit and scope of the claims. The essence of my invention is not limited to the particular shape of the paddles shown.

Having described my invention, I claim:

1. A self-cleaning drag conveyor for particulate material comprising a first straight trough section at a first level having a material inlet, an elongated second curvilinear trough section having a first end tangential to said first section and a second end at a level above said first end, and a third straight inclined trough section tangential to the second end of said second section and having an outlet end for discharging particulate material at a second level above the first level; said sections being interconnected as an inline conveyor having a continuous bottom trough with side walls inclined laterally inwardly and downwardly toward the trough bottom whereby material is gravitationally urged toward said bottom throughout the length of said trough; a drive sprocket at the outlet end of said conveyor; a continuous chain travelling through said conveyor about said drive sprocket and passing around a driven idler sprocket at the material inlet, means for driving said drive sprocket to pull a lower run of the continuous chain along a carrying path within and adjacent said trough bottom and to return the chain in an upper run along a return path generally parallel to said carrying path; means for maintaining the chain under a predetermined operating tension; and a plurality of conveying paddles fastened to and intermittently spaced along said chain so as to continuously convey material from said material inlet to said outlet end, said paddles being mounted perpendicularly and radially outwardly relative to said chain and further having first trough-contacting outer edges configured to snuggly fit the bottom and downwardly-inclined side walls of said trough throughout the length of the conveyor;

said trough side walls further having inwardly and upwardly converging portions extending the length of the conveyor from points on the side walls spaced above the trough bottom; each of said paddles having second trough-contacting outer edges converging symmetrically from opposing sides thereof generally toward the portion of the chain supporting each respective paddle, which second paddle outer edges correspond to the inwardly and upwardly converging portions of said trough side walls; said first and third trough sections being provided with physical clearance between the second trough-contacting outer edges of the paddles and the upwardly converging portions of the side walls whereby a small degree of vertical floating movement of the paddles is permitted along the carrying path during passage of the paddles through said first and third trough sections under heavy material loading conditions of the conveyor; the improvement comprising:

the inwardly and upwardly converging portions of said second trough section being positioned further inwardly and downwardly toward the trough bottom than the corresponding converging portions of the first and third trough sections so as to closely fit the corresponding second trough-contacting outer edges of the paddles during their travel through the second section and thereby inhibit floating of the paddles during their passage through the second section; and a cover overlying said return path for at least the full length of the second section, said cover including bearing surfaces providing bearing support for the first trough-contacting outer edges of the paddles while moving through the return path of said second trough section and thereby assisting in maintaining the predetermined tension in said chain.

2. The invention set forth in claim 1 wherein said third trough section comprises a short head section which incorporates said conveyor outlet end.

3. The invention set forth in claim 1 wherein the underside of said second trough section cover corresponds in cross-sectional shape to the first trough-contacting outer edges of the paddles.

4. The invention set forth in claim 1 wherein the predetermined chain tension is maintained in said second trough section solely by means of the first trough-contacting outer edges of the paddles contacting with corresponding inside surfaces of the cover and the second trough-contacting outer edges of the paddles contacting the inwardly and upwardly converging edges of said second trough section.

5. The invention set forth in claim 4 wherein said paddles are supported along the return path in the first and third trough sections by said second trough-contacting outer edges contacting with downwardly and inwardly inclined bearing surfaces corresponding to the second trough-contacting outer edges of the paddles and extending the full length first and third trough sections.

6. The invention set forth in claim 1 wherein a divider pan isolates the carrying and return paths in at least the second section for its full length, to prevent rearward flow of conveyed material over the paddles in opposition to the carrying path in said second section.

7. The invention set forth in claim 6 wherein a second divider pan is provided in said third section.

8. The invention set forth in claim 1 wherein the first end of said second trough section has a first transition portion leading thereinto for gradually decreasing the cross-sectional dimensions of the trough until floating movement of the paddles becomes inhibited.

9. The invention set forth in claim 8 wherein said second trough section has a second transition portion exiting from said second trough section at said second end for enlarging the cross-sectional dimensions of the trough to those of the third trough section.

10. A bend section for the trough of a self-cleaning drag conveyor comprising:

a longitudinal upwardly-curved trough having a continuous bottom and opposed side walls directed laterally inward toward the bottom wall, whereby conveyed material is gravitationally urged toward said bottom;

a unidirectionally-driven continuous chain having a material-carrying path extending in one direction through and within said trough and being spaced above its bottom and a return path extending in a direction opposite to said carrying path and spaced above said carrying path; said bottom, carrying path and return path being arcuate and generally concentric about a center above said bend section;

a plurality of conveying paddles fastened to and intermittently spaced along the chain so as to continuously and unidirectionally convey material through said bend section;

said paddles being mounted perpendicularly radially outwardly relative to said chain and having trough-contacting outer edges configured to snuggly fit the bottom and at least the lower portions of said side walls of said trough in said carrying path;

opposing inwardly and upwardly converging bearing surface portions extending the length of the carrying path of said bend section along opposite sides of said trough;

a bearing surface extending the full length of said bend section above said chain return path for surface supporting said paddle outer edges during passage of the paddles through said return path of said bend section and maintaining tension on said chain;

the outer edges of all of said paddles being shaped and sized to closely coincide to said trough bottom, side walls and at least a major length of said converging bearing surface portions whereby to assure complete removal and self-leaning of conveyed material from the drag conveyor at completion of a conveying operation; and, said converging bearing surface portions providing the primary load bearing surface of said paddles toward said center during passage of paddles through said material-carrying path of said bend section.

11. A bend section for the trough of a self-cleaning drag conveyor according to claim 10 wherein a short transition portion is provided in said bend section at the inlet end thereof to produce a gradually-decreasing cross-section of said trough from a size which enables a nominal degree of vertical floating movement of said paddles as they enter said bend section to a smaller cross-sectional size which snuggly confines the paddles against floating while traversing the bend section beyond the transition portion.

12. The invention set forth in claim 11 wherein said a second short transition portion is provided at the outlet end of said bend section, said second transition portion gradually increasing in cross-sectional dimensions to again enable a small degree of vertical floating movement of the paddles as they exit from the bend section.

13. The invention set forth in claim 12 wherein said bend section comprises three inline interconnected separate sections each having an attaching steel flange at opposite ends of each of said separate sections, the attaching flanges of the center one of said sections and one flange of each of the outer sections having a common cross-sectional size which is smaller than the flanges at the outermost ends of the bend section, all of said flanges being generally U-shaped and having inner edges for supporting steel plates that are directly welded to said inner edges, said flange inner edges, when plates are welded thereto, providing fixtures for producing the transition portions at each end of the bend section and the paddle-confining portion intermediate the transition portions.

14. The invention set forth in claim 13 wherein said path bearing surface comprises a cover which extends the full length of said three separate sections.

15. The invention set forth in claim 10 wherein said return path bearing surface comprises a cover and wherein said trough bottom and the bearing surface of said cover each comprise a flat portion and inwardly-converging portions merging with said flat portion.

16. The invention set forth in claim 10 wherein at least one straight trough section corresponding in cross-sectional shape to the cross-sectional shape of the bend section is provided to lead into or away from the bend section.

17. A self-cleaning drag conveyor particulate material comprising, a first straight trough section at a first level having a material inlet, an elongated second curvilinear trough section having a first end tangential to said first section and a second end at a level above said first end, and a third straight inclined trough section tangential to the second end of said second section and having an outlet end for discharging particulate material at a second level above the first level;

said sections being interconnected as an inline conveyor having a continuous bottom and side walls directed laterally inwardly and downwardly toward the trough bottom whereby material is gravitationally urged toward said bottom from said material inlet to said outlet end throughout the length of said trough;

a drive sprocket at the outlet end of said conveyor;

a continuous chain traveling through said conveyor about said drive sprocket and passing around a driven idler sprocket at the material inlet;

means for driving said drive sprocket to pull a lower run of the continuous chain along a carrying path within and adjacent said trough bottom and to return the chain in an upper run along a return path generally parallel to said carrying path;

means for maintaining the chain under a predetermined operating tension;

a plurality of conveying paddles fastened to and intermittently spaced along said chain so as to continuously convey material from said material inlet to said outlet end, said paddles being mounted perpendicularly and radially outwardly relative to said chain and further having first trough-contacting outer edges configured to snuggly fit the bottom throughout the length of the conveyor;

the trough of at least said second curvilinear trough section having inwardly and upwardly converging bearing surface portions extending through the second section and spaced above the trough bottom;

each of said paddles having second outer edges converging symmetrically generally toward the portion of the chain supporting each respective paddle, which paddle second outer edges correspond to the inwardly and upwardly converging surface portions of said second section;

said inwardly and upwardly converging surface portions providing the primary load bearing contact area of said paddles when in said second section carrying path and being spaced relative to the trough bottom of said second section so as to confine the paddles relatively closely between said converging surface portions and said bottom; and a bearing surface in said return path for at least the fill length of the second section, said return path bearing surface providing load bearing support for the first trough-contacting outer edges of the paddles while moving through the return path of said second trough section and thereby assisting in maintaining the predetermined tension in said chain.

18. The self-cleaning drag conveyor of claim 17 wherein said return run in said first straight section has bearing surface portions at opposite sides of said trough for supporting said chain and paddles against gravity by frictional contact with the second outer edges of said paddles for the length of said first straight section.

19. The self-cleaning drag conveyor of claim 17 wherein each of said paddles is beveled along its inner edge between its second outer edges and wherein said paddles are approximately one-half inch in thickness, said thickness providing a substantial wear area of contact of said paddle second outer edges with said inwardly and upwardly converging bearing surface portions.

20. The self-cleaning drag conveyor of claim 18 wherein said second outer edges become load-bearing surfaces in both counteracting the downward force of gravity in said return path and counteracting the upward force of chain tension in said second curvilinear trough section.

\* \* \* \* \*